United States Patent [19]

Hanks et al.

[11] 4,456,110
[45] Jun. 26, 1984

[54] SELF-CONTAINED FAN CLUTCH

[75] Inventors: James V. Hanks, Minneapolis; Leonid Dayen, Plymouth, both of Minn.

[73] Assignee: Horton Industries, Inc., Minneapolis, Minn.

[21] Appl. No.: 401,591

[22] Filed: Jul. 26, 1982

Related U.S. Application Data

[63] Continuation of Ser. No. 205,619, Oct. 11, 1980, abandoned.

[51] Int. Cl.³ .................. F16D 43/25; F16D 31/02; F16D 25/063
[52] U.S. Cl. .................. 192/82 T; 192/57; 192/59; 192/85 A; 192/93 A
[58] Field of Search .............. 192/57, 82 T, 85 A, 192/93 A, 59

[56]  References Cited

U.S. PATENT DOCUMENTS

| | | | |
|---|---|---|---|
| 1,882,807 | 10/1932 | Gillett | 192/59 X |
| 2,153,372 | 4/1939 | Hyde | 192/57 X |
| 2,876,881 | 3/1959 | Parrett | 192/57 X |
| 3,207,279 | 9/1965 | Ahlen | 192/57 |
| 3,488,980 | 1/1970 | Burrough | 192/59 X |
| 4,231,457 | 11/1980 | Cornish | 192/82 T |
| 4,304,321 | 12/1981 | Wong | 192/82 T |
| 4,355,710 | 10/1982 | Schilling | 192/91 A |
| 4,408,685 | 10/1983 | Schilling | 192/85 A |

Primary Examiner—Allan D. Herrmann
Attorney, Agent, or Firm—Wicks & Nemer

[57]  ABSTRACT

A self-contained fan clutch including a housing in which is contained a rotatable drive disc driven by a source of power connected to the housing and the drive disc. Also mounted within the housing is an annular piston having an annular piston portion reciprocable within a cylinder member, the piston portion carrying a friction facing engageable with the driven drive disc when the piston is actuated within the cylinder. The piston divides the cylinder into a high pressure side and a low pressure side with the piston, piston portion and cylinder carried by the housing with the housing having a series of fan blades mounted thereon.

The cylinder member mounts a reciprocal pump plunger actuated by a cam mounted on the driven drive disc for pressurizing the high pressure side of the cylinder which causes the friction facing of the piston portion to engage the drive disc and be rotated together with the housing and fans thereon. The pump plunger is actuated by a thermal sensor pill. Also included is apparatus for relieving pressure in the high pressure side of the cylinder and shunting it to the low pressure side of the cylinder thereby causing the piston to shift to the high pressure side by reason of springs carried by the housing and piston whereby the friction facing is relieved from the drive disc and the housing and fan thereon ceases to rotate.

36 Claims, 9 Drawing Figures

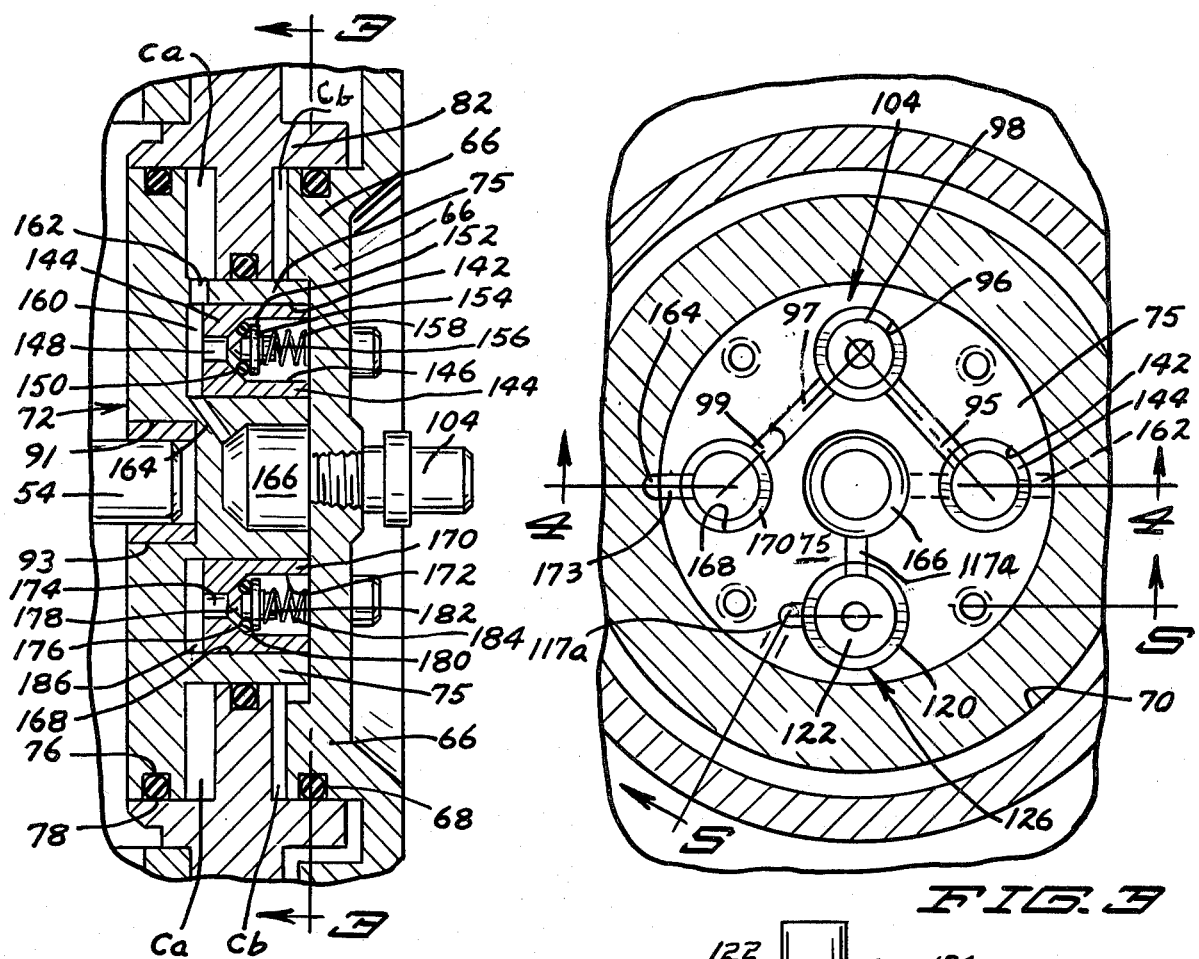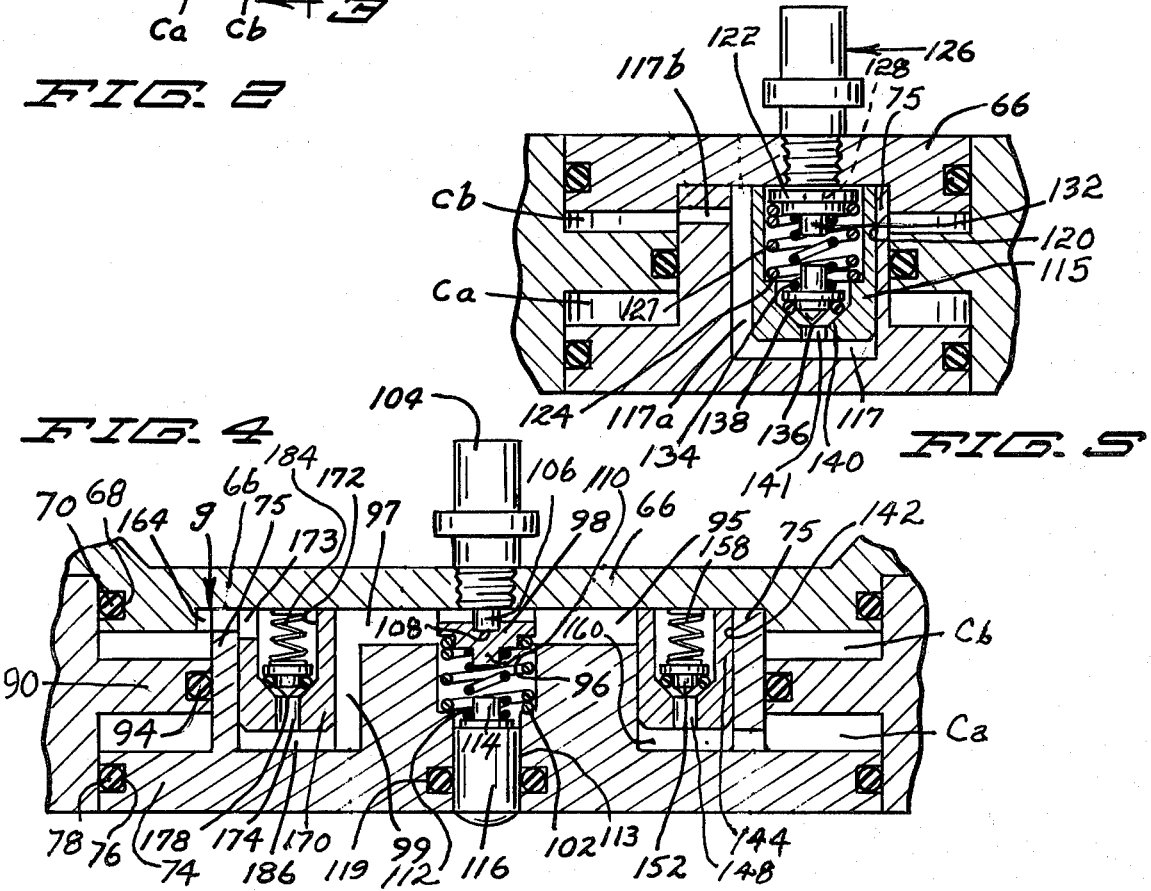

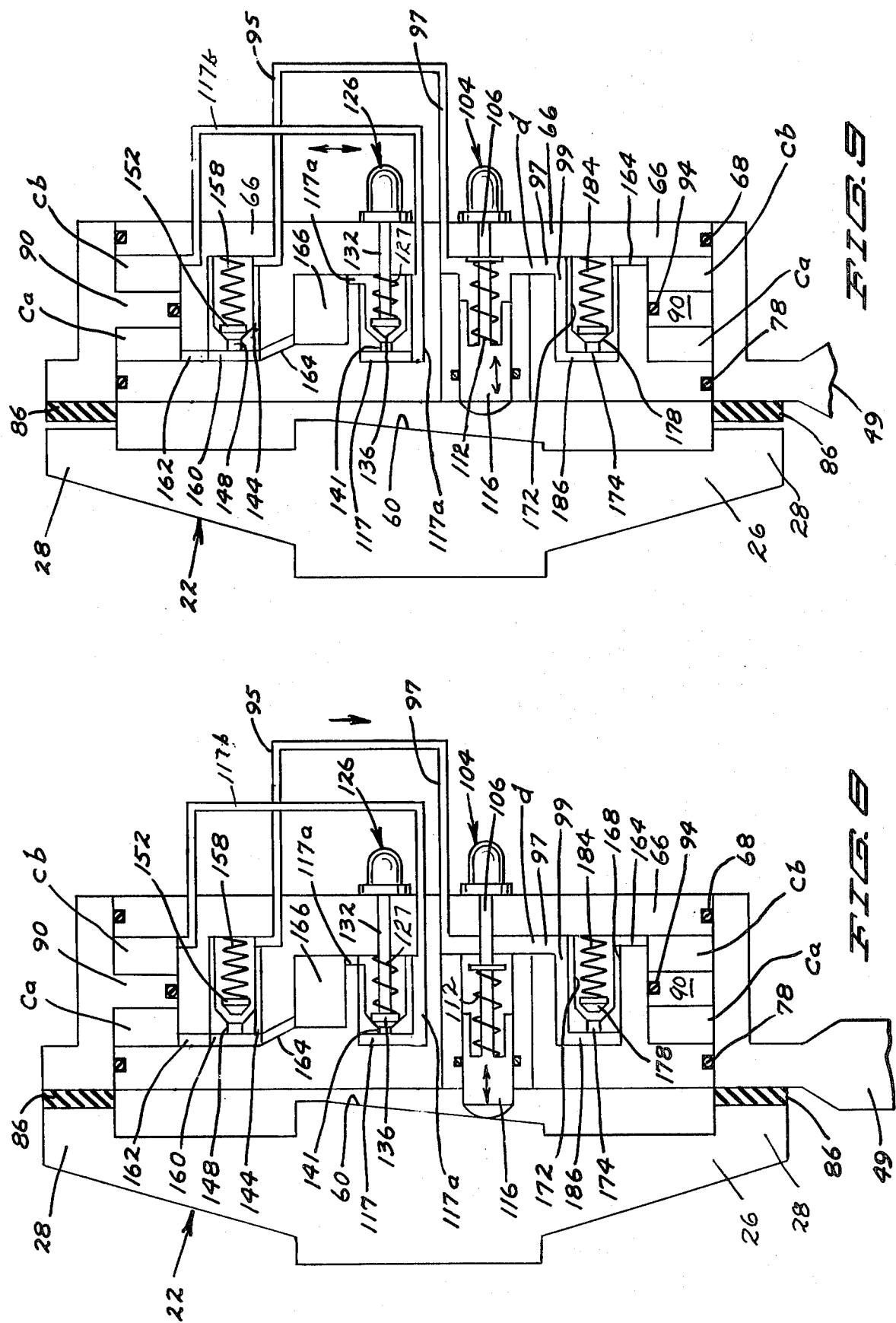

SELF-CONTAINED FAN CLUTCH

SUMMARY

This application is a continuation of application Ser. No. 205,619, filed 10/11/80 now abandoned.

The invention relates broadly to clutches and more particular to a fan clutch mounted on a live shaft for intermittent cooling of an engine. It is an object of the invention to provide a fan clutch which is self-contained and temperature controlled with no hydraulic or electric power lines connected externally to the clutch for the operation thereof. Known self-contained clutches modulate, that is, the amount of power transmission is proportional to the ambient temperature, while in the invention disclosed, the clutch is either totally "on" or totally "off" depending upon the selected temperature for operation or non-operation of the clutch.

The pumping system disclosed does not modulate because there is a selected temperature for closure and opening by means of a first thermal sensor controlling a bypass check valve which either allows pressure to be pumped up or fluid to be bypassed from a high pressure cavity on one side of a piston carrying a friction facing.

It is a further object of the invention to provide a second thermal sensor which engages or disengages a piston pump in concert with the first mentioned thermal sensor thereby providing the fully "on" or "off" of the clutch.

It is an object of the invention to provide a pumping system internally of the clutch which in turn actuates under internal fluid pressure a self-contained friction clutch.

It is a still further object of the invention to provide an internal piston pump which is operative only when needed to engage the friction surfaces of the clutch which provides power transmission to the fan for engine cooling.

The invention will appear more clearly from the following detailed description when taken in connection with the accompanying drawings, showing by way of example a preferred embodiment of the inventive idea wherein like numerals refer to like parts throughout.

In the drawings forming part of this application:

FIG. 2 is a partial sectional view on the line 2—2 of FIG. 1 rotated 90° from FIG. 1.

FIG. 3 is a sectional view on the line 3—3 of FIG. 2.

FIG. 4 is a view on the line 4—4 of FIG. 3.

FIG. 5 is a sectional view on the line 5—5 of FIG. 3.

FIG. 8 is a schematic view of the inventive concept with the clutch in engaged condition.

FIG. 9 is a schematic view similar to FIG. 8 but with the clutch in disengaged condition.

Figure 1:
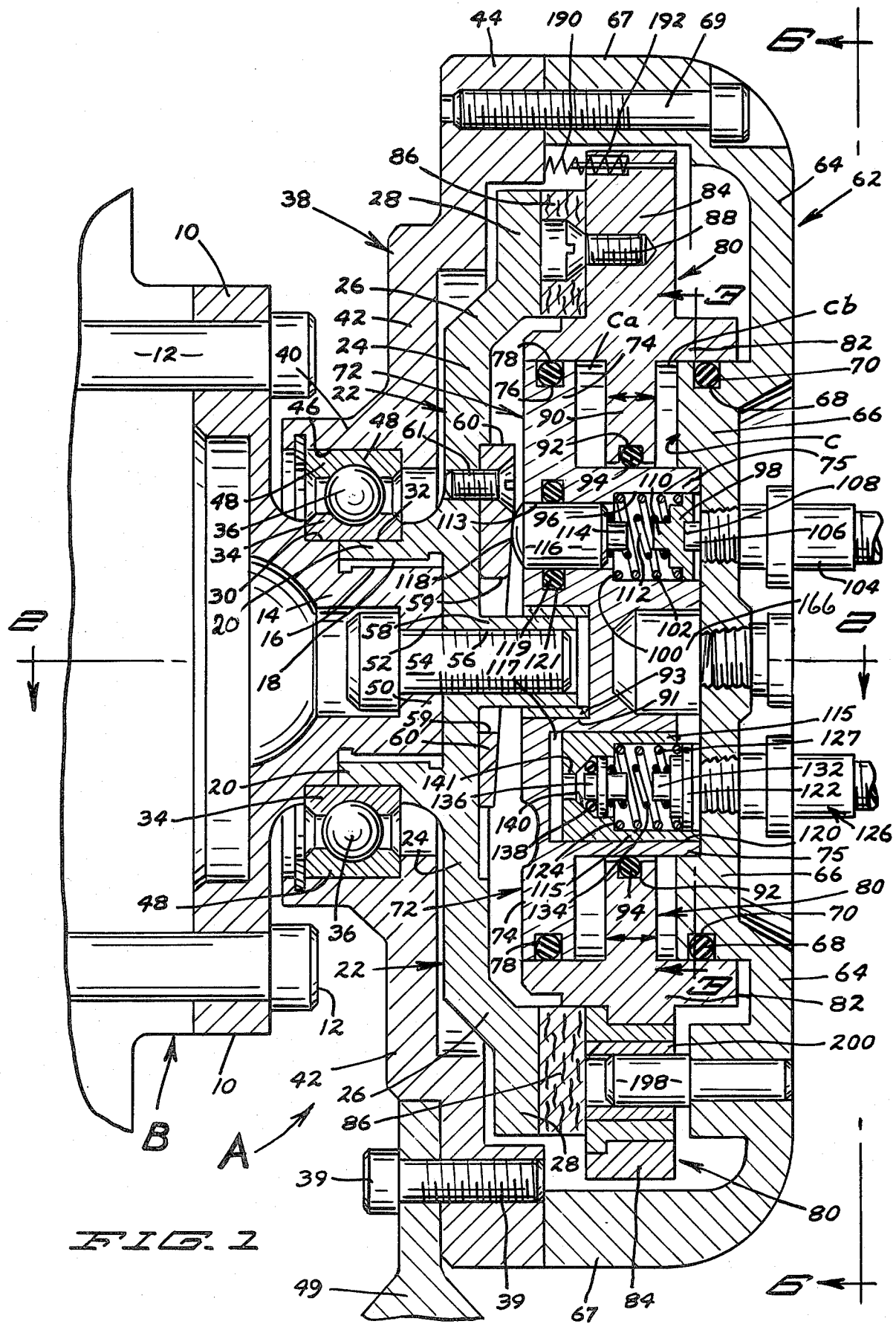
FIG. 1 is a sectional view through a self-contained fan clutch embodying the inventions on the line 1—1 of FIG. 6.
Figure 6:
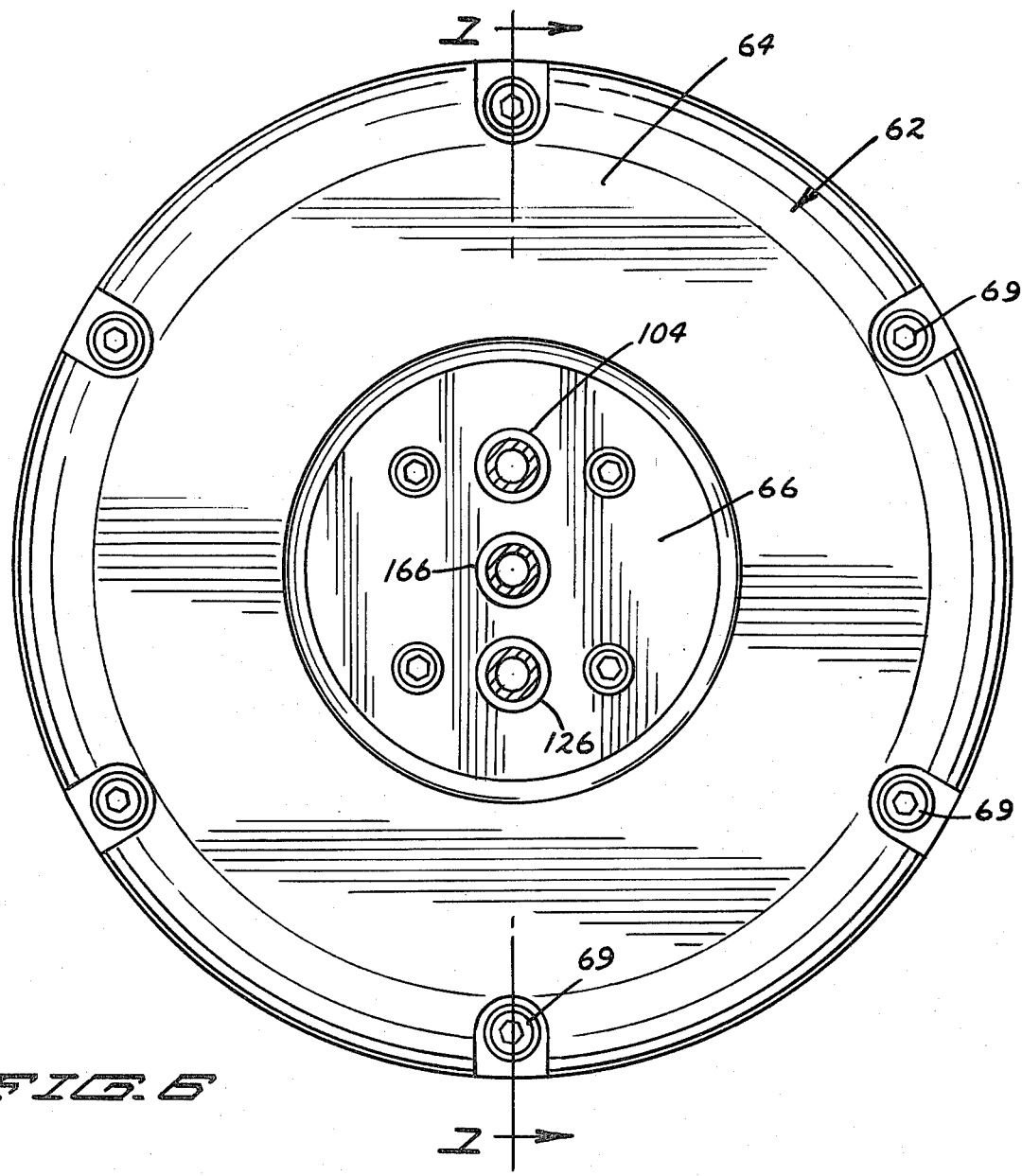
FIG. 6 is an end elevational view of the fan clutch.

Referring to the drawings in detail, the self-contained fan clutch A includes the circular mounting plate 10 secured to the coupling B by means of the bolts 12, the coupling connected to a live shaft not shown. As an aid in the functional description of the clutch see FIGS. 8 and 9. Formed on the mounting plate 10 is the hub 14 having splines 16 thereon in engagement with splines 18 of the hub 20 of the driven drive disc 22 having the flat central portion 24 which terminates radially in the offset portion 26 which in turn terminates in the outer flange portion 28.

The hub 14 is formed with the recess 30 and the hub 20 is formed with the recess 32 with the inner race 34 of the bearing 36 clamped between the shoulders of the recesses 30 and 32. The numeral 38 designates a first outer housing section which includes the hub portion 40 from which radially extends the flat central portion 42. The portion 42 terminates in the offset portion 44. The hub portion 40 has formed therein the recess 46 in which is press fit the outer race 48 of the bearing 36 whereby the first housing section 38 is rotatably mounted on the hubs 14 and 20. Secured to the first housing section 38 by means of bolts 39, are a multiplicity of fan blades 49.

The end portion 50 of the hub 14 is formed with the hole 52 through which extends the bolt 54 which threadedly engages the axial opening 56 of the portion 24 of the disc 22 and the extension 58 thereof. Secured to the inner face of the portion 24 of the disc 22 is the driven cam 60 by means of the bolts 61 and extending through the cam is the central opening 59 through which the extension 58 extends.

The numeral 62 designates a second outer housing section which includes the flat circular face portion 64 which terminates in the outer peripheral flange portion 67. A series of spaced bolts 69 extending through the flange 67 and into the offset portion 44 of housing section 38 secure the first housing section to the second housing section. Formed on the inner surface of the portion 64 of the housing portion 62 is the annular shoulder 66 a portion of which forms an annular cylinder wall on the outer periphery of which is formed the groove 68 and in which is positioned the O-ring 70.

Further provided is the annular cylinder member 72 having the central and axial extension portion 75 from which extends the outer peripheral flange portion 74 which has formed in the outer edge thereof the recess 76 in which is positioned the O-ring 78. The numeral 80 designates an annular piston having the central annular portion 82 normal to the radial axis of the portion 82 and from which radially and outwardly extends the annular portion 84. The O-ring 70 has sealing contact with the piston annular portion 82. Secured to the piston portion 84 is the friction facing ring 86 by means of spaced bolts 88.

Extending radially inwardly from the central annular portion 82 of the piston 80 is the annular piston flange portion 90 on the inner edge of which is formed the recess 92 in which is positioned the O-ring 94 having sealing contact with extension 75. The flange 90 is positioned between the flange portion 66 of the second housing portion 62 and the flange 74 of the cylinder member 72 for slideable movement therebetween in a cylinder cavity C formed between the flange 66 and the flange portion 74. The piston flange 90 is sealed by the O-ring 70, 78 and 94. The cylinder cavity C is divided into two parts, the low pressure side Ca and the high pressure side Cb, by the piston flange 90.

Formed in the center of the cylinder member 72 is the axial recess 91 in which is mounted the bronze support bushing 93 in which is positioned the extension 58 for relative rotation between the extension 58 and the bushing 93.

Formed in the extension 75 of the cylinder member 72 is the first cavity 96 in which is slideably mounted a push plate 98, and mounted between the push plate 98 and the annular shoulder 100 of the cavity 96 is the coil spring 102, the confined length of which provides a minimum of a 10 lb. load between the shoulder 100 and the push plate 98. Formed in the axial extension 75 are the conduits 95 and 97 which communicate with cavities hereinafter described, particular FIGS. 3, 4 and 5, conduit 97 communicates with conduit 99.

The numeral 104 designates a first conventional wax filled thermal pill screwed into the flange portion 66 with the stem 106 extending into the recess 108 of the push plate 98. The push plate 98 has formed on the inner surface thereof the axial projection 110 which mounts the coil spring 112 the other end of which is mounted on a similar projection 114 mounted on the outer end of the cylindrical pump plunger 116 having the semi-spherical outer end 118 for contact with the cam 60. The pump plunger 116 reciprocates in the cylinder wall 113 with the plunger 116 having sealing engagement with the O-ring 119 in the annular groove 121. The spring 112 provides a return force to the pump plunger as it reciprocates as hereinbefore described.

Also formed in the extension 75 is a second receiver cavity 120 in which an insert sleeve 115 is press fit. The sleeve is spaced on the bottom of the cavity 120 to form a passageway 117 which communicates with a transversely directed conduit 117a, which in turn connects with passageway 117b which connects with cavity Cb, FIGS. 1 and 5 in particular. Slideably mounted in the sleeve is a push plate 122 and mounted between the push plate 122 and the annular shoulder 124 of the cavity 120 is the coil spring 127 the confined length of which provides a minimum of a 10 lb. load between the shoulder 124 and the push plate 122. The numeral 126 designates a second conventional wax filled thermal pill screwed into the flange portion 66 with the stem 128 extending into the recess 130 of the second push plate 122. The push plate 122 has formed on the inner surface thereof the axial projection 132 which mounts the coil spring 134 the other end of which engages a conventional thermally controlled bypass check valve 136 having an O-ring 138 which seals upon the valve seat 140 on conduit 141 as hereinafter described.

The numeral 142 designates a third receiver cavity, FIG. 2, in which is press fit an insert sleeve 144 in itself having a cavity 146 the inner end of which terminates in the conduit 148. At the juncture of the cavity and the conduit is the valve seat 150. Further provided is the suction side poppet valve 152 having the shoulder 154 from which extends the stem 156. A coil spring 158 is positioned on the stem 156 and between the shoulder 154 and the inner face of the outer peripheral flange portion 66 normally urging the valve 152 to a closed position. The sleeve 144 is spaced from the bottom of the cavity 142 to form a passageway 160 interconnecting with the conduit 148 and hole 162 which communicates with cylinder cavity part Ca. Leading from the passageway 160 is the conduit 164 which connects with the fluid reservoir 166.

The numeral 168 designates a fourth receiver cavity in which is press fit an insert sleeve 170 in itself having a cavity 172 the inner end of which terminates in the conduit 174. At the juncture of the cavity 172 and the conduit 174 is the valve seat 176. Further provided is the pressure side poppet valve 178 having the shoulder 180 from which extends the stem 182. A coil spring 184 is positioned on the stem 182 and between the shoulder 180 and the inner face of the outer peripheral flange portion 66 normally urging the valve 178 to a closed position. The sleeve 170 is spaced from the bottom of the cavity 168 to form a passageway 186 which communicates with conduit 99 at substantially a right angle, particularly FIGS. 3 and 4. Cavity 172 communicates with conduit 173 which communicates with conduit 164 and thence to high pressure cylinder cavity Cb.

Further provided is a multiplicity of spaced clutch return springs 190, FIG. 1, each of which is positioned in a recess 192 formed in the piston portion 84 and positioned against the offset portion 44 of housing section 38.

To allow reciprocal movement of the piston 80 within the cylinder cavity C a pluraltiy of spaced torque bolts 198 are provided each of which is secured at one end in the portion 64 of the second outer housing 62 with the other end slideably mounted in the sleeve 200 mounted in the annular portion 84 of the piston 80.

OPERATION

With a cold engine on which the clutch A is mounted, the clutch interface parts 86 and 28 are separated by a gap rendering the clutch in a disengaged condition with the blades 49 stationary. Under such condition, the stem 106 of thermal pill 104 is fully retracted and the stem 128 of thermal pill 126 is also fully retracted. Particular reference is made to FIG. 8 of the drawings. As the engine attains a predetermined temperature established by the thermal characteristics of the wax in the pills, the stem 106 of pill 104 extends due to the expansion of the wax in the pill. As a result, the spring 112 compresses and in turn moves piston pump plunger 116 into contact with cam 60 which is rotating as a result of an operating engine rotating the coupling B. As a result the pump plunger 116 reciprocates on its longitudinal axis with the cam moving the plunger inwardly once on one revolution of the cam, with the piston pump plunger returned outwardly by the spring 112.

As a result of the above and during the outward movement of the piston pump plunger, fluid is sucked by the inner end of the piston plunger from the low pressure side Ca of the piston 90 and reservoir 166 via conduits 162, 160, 186 and 95, the suction being sufficient to open check valve 152 against the action of spring 158 allowing such fluid movement. Further, the suction fills the inner side of the piston plunger 116 with fluid on the outward stroke of the plunger piston. As the cam 60 rotates and goes over center, the piston is forced by the cam inwardly creating a pumping pressure within the fluid previously sucked into the inner side of the piston-plunger 116. Such pressure causes a flow of fluid through conduits 97, 99, 186, conduit 174 and sleeve cavity 172 which forces open poppet valve 178 normally held closed by spring 184. Fluid pressure flows from the cavity 172 of sleeve 170 through conduit 173 to conduit 164 to high pressure side Cb whereby piston portion 84 is moved to bring engagement of friction facing 86 in pressure contact with drive disc thereby causing clutch engagement to take place. As a result, the housing with the blades 49 thereon rotates.

With the clutch engaged the pumping action of the piston plunger 116 ceases and the piston plunger simply rotates with the cam 60. Thus, the pump provides pressure only in an amount necessary to have interface engagement of friction facing 86 and drive disc 22. In the event of a demand for additional torque transmission by the fan such as during an increase in R.P.M. of the engine, then slip of the clutch interface will allow relative motion between the cam 60 and the piston plunger 116 which in turn creates another segment of piston plunger cycle sufficient to create pressure adequate to cause positive engagement of the clutch interface of friction facing 86 and drive disc 22.

During the above described clutch engagement cycle, it is to be noted that thermal wax pill 126 was also heated along with pill 104 and as a result, the valve 136 is maintained in a closed position thereby checking fluid flow from the reservoir 166 through conduit 117a i.e. the high side of the reservoir. In other words, the piston pump cannot draw from the high side of the reservoir when the unit is hot because the check valve 136 is held closed.

As cooling of the engine takes place and the airflow past the thermal sensor pills 104 and 126 takes place, the temperature of the pills recedes. The pill 126 causes the retraction of the bypass valve 136 whereby high fluid pressure is shunted to the low pressure side Ca through conduits 141,117a, reservoir 166 and conduits 164, 160, 162 to low pressure piston side Ca. As a result, the friction facing 86 is separated from the drive disc 22 thereby causing the housing and fan blades thereon to cease rotating, particularly FIG. 9.

Briefly, and with particular reference to FIG. 8, when the thermal pill 104 is heated, the stem 106 moves the piston plunger 116 to contact the rotating cam 60. Assuming the piston plunger is moved outwardly of its cylinder, it sucks from conduits 95 and 97, 144, 148, 160 and 162 to the low pressure side Ca of the piston 90 which relieves pressure at Ca, and at the same time cannot draw on conduits 97, 99, 186, 174, 164 and high pressure side Cb due to the fact that valve 178 is sucked to a closed position.

Then when the piston 116 is moved inwardly by the cam acting upon the piston, fluid pressure is increased through conduits 97, 99, 186, 174, 164 and into cavity high pressure side Cb thereby forcing the piston 80 with the friction facing ring 86 thereon into contact with driven drive disc 22 which thereby rotates the housing with the fan blades thereon. Further, as the piston is moved inwardly, pressure in conduits 95 and 97 and sleeve 144 cannot pressurize beyond valve 152 for that valve is moved into a closed position by the fluid pressure against the action of the return spring 158. Thus, cavity section Ca is held relieved whereby the piston may move as above described. It will be seen that during the above described clutch engagement cycle, the thermal wax pill 126 was heated along with pill 104 whereby valve 136 is held in a closed position thereby checking fluid flow from reservoir. As the clutch is engaged, the plunger rotates with the cam.

Figure 7:
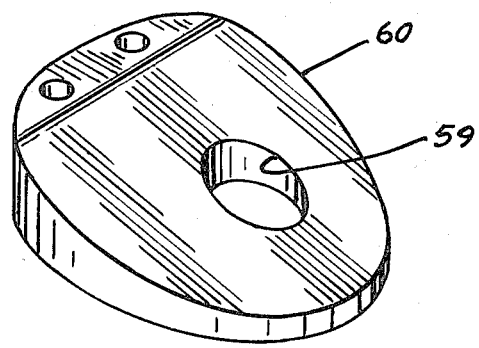
FIG. 7 is a perspective view of the cam.

As the engine is cooled, the pill temperature recedes. The pill 126 causes the bypass valve 136 to recede whereby high fluid pressure is shunted to the low pressure side Ca through conduits 141, 117a, reservoir 166, 164, 160 and 162, thereby causing the piston 90 to shift to the high side Cb by reason of the springs 190. FIGS. 1 and 7 and the housing and fan blades to cease to rotate.

Having thus described the invention, what is claimed as new and desired to be secured by Letters Patent is:

1. A self-contained clutch having no external controls comprising, in combination: a first member for connection to a source of power; a second member rotatably mounted with respect to the first member; a drive disc in the same rotational position as the first member; friction facing means reciprocally carried by the second member for engagement with the drive disc; an environment sensing member carried by the second member; and means actuated by the first member and the condition of the environment sensing member for causing the friction facing to contact the drive disc when the environment sensing means senses a first environment range and to disengage the friction facing from the drive disc when the environment sensing member senses a second environment range so that when the condition of the environment sensed by the environment sensing means is within a first range, the friction facing is disengaged from the drive disc and thus the first and second members are not rotatably interrelated but when the condition of the environment sensed by the environment sensing means is within a second range, the friction facing is engaged with the drive disc and the first and second members are rotatably interrelated.

2. The clutch of claim 1 wherein the first member comprises a shaft, and wherein the second member is rotatably mounted on the shaft.

3. The clutch of claim 1 wherein the environment sensing means comprises heat sensing means for sensing the temperature of the environment.

4. A self-contained and temperature controlled, totally "on" or totally "off" fan clutch having no fluid or electric power lines connected externally to the clutch for connection to a live power shaft of an engine comprising, in combination: a drive disc having a first clutch friction surface, with the drive disc being coupled to the live power shaft; a fluid cavity for receiving fluid; means for moveably dividing the fluid cavity into a first section and a second section; a second clutch friction surface operably attached to the moveably dividing means for engagement with the first clutch friction surface; means for biasing the second clutch friction surface away from the first clutch friction surface; means for pumping fluid from the first section of the fluid cavity to the second section of the fluid cavity causing the moveably dividing means to move toward the first section and the second clutch friction surface attached to the dividing means to engage the first clutch friction surface, with the pumping means including a first means mounted on the clutch for sensing engine temperature for actuating the pumping means when the engine temperature reaches a predetermined temperature; means for shunting the hydraulic fluid from the second section to the first section of the fluid cavity causing the moveably dividing means to move toward the second section and the second clutch friction surface to disengage from the first clutch friction surface under the action of the biasing means, with the shunting means including a second means mounted on the clutch for sensing engine temperature for actuating the shunting means when the engine temperature reaches a predetermined temperature.

5. The fan clutch of claim 4 further comprising a cam in a non rotatable relation to the live power shaft and the drive disc, wherein before the engine temperature reaches the predetermined temperature, the pumping means does not interact with the cam and wherein after the engine temperature reaches the predetermined temperature, the first engine temperature sensing means actuates the pumping means by causing the pumping means to contact the cam.

6. The fan clutch of claim 5 wherein the pumping means includes a pump plunger reciprocal in a pump cavity, wherein the pump plunger includes an outer end for contacting with the cam causing the pump plunger to reciprocate in the pump cavity.

7. The fan clutch of claim 6 wherein while the pump plunger is withdrawn in the pump cavity, fluid is sucked from the first section of the fluid cavity and while the pump plunger is moved into the pump cavity, fluid is forced into the second section of the fluid cavity, with the pump means further comprising means for preventing fluid from flowing into the first section of the fluid cavity when fluid is being forced into the second section of the fluid cavity and means for preventing fluid from being sucked from the second section of the fluid cavity when the fluid is being sucked from the first section of the fluid cavity.

8. The fan clutch of claim 7 wherein the fluid preventing means comprise check valves.

9. The fan clutch of claim 7 wherein the cam is wedge shaped and is attached to the drive disc.

10. The fan clutch of claim 4 wherein the shunting means comprises means for providing fluid flow from the second section of the fluid cavity to the first section including valve means for selectively stopping or allowing fluid flow through the fluid flow providing means, with the valve means being actuable by the second engine temperature sensing means, with the valve means stopping fluid flow through the fluid flow providing means when the engine temperature reaches the predetermined temperature and the valve means allowing fluid flow through the fluid flow providing means when the engine temperature is below the predetermined temperature.

11. The fan clutch of claim 4, 6 or 10 wherein the engine temperature sensing means comprises wax filled thermal pills.

12. A self-contained and temperature controlled, totally "on" or totally "off" fan clutch having no fluid or electric power lines connected externally to the clutch for connection to a live power shaft of an engine comprising, in combination: a drive disc having a first clutch friction surface, with the drive disc being coupled to the live power shaft; a fluid cavity for receiving fluid; means for moveably dividing the fluid cavity into a first section and a section section; a second clutch friction surface operably attached to the moveably dividing means for engagement with the first clutch friction surface; means for biasing the second clutch friction surface away from the first clutch friction surface; means for pumping fluid from the first section of the fluid cavity to the second section of the fluid cavity causing the moveably dividing means to move toward the first section and the second clutch friction surface attached to the dividing means to engage the first clutch friction surface; means for shunting the hydraulic fluid from the second section to the first section of the fluid cavity causing the moveably dividing means to move toward the second section and the second clutch friction surface to disengage from the first clutch friction surface under the action of the biasing means; and means mounted on the clutch for sensing engine temperature for actuating the pumping means and the shunting means when the engine temperature reaches a predetermined temperature.

13. The fan clutch of claim 12 wherein the engine temperature sensing means comprises, in combination: a first wax filled thermal pill for actuating the pumping means when the engine temperature reaches a predetermined temperature; and a second wax filled thermal pill for actuating the shunting means when the engine temperature reaches a predetermined temperature.

14. In a self-contained fan clutch including an annular housing having fan blades extending therefrom and mounted for rotation upon and about a drive disc by a live shaft, an annular piston mounted for reciprocation within an annular cylinder carried by and within said housing, said piston dividing said cylinder into a high pressure cavity side and a low pressure cavity side, friction facing means carried by said piston for engagement with said driven drive disc for rotation of said housing and fan blades thereon, the improvement thereof consisting in apparatus for the actuation of said piston for engagement and disengagement of said friction facing means of said piston with said driven drive disc for the rotation and non-rotation of said housing and fan blades thereon, said improvement including
(a) a cam carried by said driven drive disc for rotation of the cam thereby,
(b) a piston plunger mounted in a recess formed in said annular cylinder for reciprocation therein by said cam,
(c) a heat sensing member carried by said housing and having engagement with said piston plunger for actuation of the piston plunger into and out of pressure contact with the cam,
(d) means responsive to the action of said piston plunger in one direction of reciprocation for causing fluid pressure to occur on the high pressure side of said piston to move said piston with the friction facing thereon into contact with said driven drive disc to thereby rotate said housing and fan blades thereon, and
(e) means for relieving fluid pressure on the low pressure side of said piston when said piston plunger is reciprocated in the opposite direction thereby moving said piston and friction facing thereon out of contact with said driven drive disc.

15. A self-contained clutch having no external controls comprising, in combination: a first member; a second member rotatably mounted with respect to the first member; a drive disc for rotation with the first member; a piston mounted for reciprocation within a cylinder carried by the second member, the piston dividing the cylinder into a high pressure cavity side and a low pressure cavity side; friction facing means engaged by the piston for engagement contact with the drive disc for providing rotation of the second member with the first member; an environment sensing means carried by the second member; and means actuated by the environment sensing means for moving fluid between the high pressure cavity side and the low pressure cavity side of the cylinder for moving the piston within the cylinder to cause the friction facing to engage and disengage with the drive disc so that when the condition of the environment sensed by the environment sensing means is within a first range, the friction facing is disengaged from the drive disc and thus the first and second members are not rotatably interrelated but when the condition of the environment sensed by the environment sensing means is within a second range, the friction facing is engaged with the drive disc and the first and second members are rotatably interrelated.

16. The clutch of claim 15 wherein the fluid moving means comprises, in combination: means for pumping fluid from the low pressure cavity side to the high pressure cavity side of the cylinder; means for shunting fluid from the high pressure cavity side to the low pressure cavity side of the cylinder when the condition of the environment is within the second range, but prevents shunting fluid between the high pressure cavity side and the low pressure cavity side of the cylinder when the condition of the environment is within the first range; and means for biasing the piston to the high pressure cavity side of the cylinder to thereby provide a fully "on" or "off" operation of the clutch.

17. The clutch of claim 16 wherein the shunting means comprises, in combination: a second environment sensing means carried by the second member; and bypass check valve means actuated by the second environment sensing means for allowing fluid to be bypassed from the high pressure cavity side to the low pressure cavity side of the cylinder.

18. The clutch of claim 17 wherein the second environment sensing means includes a stem which extends and retracts with the condition of the environment; and wherein the shunting means further comprises, in combination: a push plate for engagement with the stem of the second environment sensing means; means for biasing the push plate against the stem of the second environment sensing means; and means for biasing the push plate and the bypass check valve means apart.

19. The clutch of claim 16 wherein the fluid moving means includes, in combination: means for providing fluid passage between the high pressure cavity side and the shunting means; means for providing fluid passage between the shunting means and the low pressure cavity side; means for providing fluid passage from the low pressure cavity side to the pump means but preventing fluid passage from the pump means to the low pressure cavity side; and means for providing fluid passage from the pump means to the high pressure cavity side but preventing fluid passage from the high pressure cavity side to the pump means.

20. The clutch of claim 19 wherein the means for providing fluid passage from the low pressure cavity side to the pump means but preventing fluid passage from the pump means to the low pressure cavity side includes a suction side poppet valve and wherein the means for providing fluid passage from the pump means to the high pressure cavity side but preventing fluid passage from the high pressure cavity side to the pump means includes a suction side poppet valve.

21. The clutch of claim 16 wherein the fluid moving means further comprises, in combination: a fluid reservoir located in the second member; means for providing fluid passage between the high pressure cavity side and the shunting means; means for providing fluid passage between the fluid reservoir and the shunting means; means for providing fluid passage between the fluid reservoir and the low pressure cavity side; means for providing fluid passage from the low pressure cavity side and the reservoir to the pump means but preventing fluid passage from the pump means to the low pressure cavity side and the reservoir; and means for providing fluid passage from the pump means to the high pressure cavity side but preventing fluid passage from the high pressure cavity side to the pump means.

22. The clutch of claim 16 wherein the first member further comprises, in combination: means for rotation with the first member for actuating the pump means with the environment sensing means.

23. The clutch of claim 22 wherein the means for rotation with the first member for actuating the pump means with the environment sensing means comprises, in combination: a cam mounted on the first member; and wherein the pump means comprises, in combination: a pump plunger reciprocal in a pump cavity and having an outer end for contact with the cam of the first member.

24. The clutch of claim 23 wherein the environment sensing means includes a stem which extends and retracts with the condition of the environment; and wherein the pump means comprises, in combination: a push plate for engagement with the stem of the environment sensing means; means for biasing the push plate against the stem of the environment sensing means; and means for biasing the push plate and the pump plunger apart.

25. The clutch of claim 15 wherein the first member comprises a shaft, and wherein the second member is rotatably mounted on the shaft.

26. The clutch of claim 15 wherein the environment sensing means comprises heat sensing means for sensing the temperature of the environment.

27. A self-contained clutch having no external controls comprising, in combination: a first member; a second member rotatably mounted with respect to the first member; a drive disc for rotation with the first member; friction facing means reciprocally carried by the second member for engagement with the drive disc of the first member; an environment sensing member carried by the second member; means actuated by the first member and the condition of the environment sensing member for causing the friction facing to contact the drive disc when the environment sensing means senses a first environment range and to disengage the friction facing from the drive disc when the environment sensing member senses a second environment range so that when the condition of the environment sensed by the environment sensing means is within a first range, the friction facing is disengaged from the drive disc and thus the first and second members are not rotatably interrelated but when the condition of the environment sensed by the environment sensing means is within a second range, the friction facing is engaged with the drive disc and the first and second members are rotatably interrelated; and a piston mounted for reciprocation within a cylinder carried by the second member, with the piston dividing the cylinder into a high pressure cavity side and a low pressure cavity side, with the friction facing means being reciprocated by the piston; and wherein the means for causing the friction facing to engage and disengage with the drive disc comprises, in combination: means for moving fluid between the high pressure cavity side and the low pressure cavity side of the cylinder.

28. The clutch of claim 27 wherein the fluid moving means comprises, in combination: means for pumping fluid from the low pressure cavity side to the high pressure cavity side of the cylinder; means for shunting fluid from the high pressure cavity side to the low pressure cavity side of the cylinder; and means for biasing the piston to the high pressure cavity side of the cylinder.

29. The clutch of claim 28 wherein the environment sensing means comprises, in combination: a first environment sensing member for actuating the pumping means and a second environment sensing member for actuating the shunting means.

30. The clutch of claim 28 wherein the fluid moving means includes, in combination: means for providing fluid passage between the high pressure cavity side and the shunting means; means for providing fluid passage between the shunting means and the low pressure cavity side; means for providing fluid passage from the low pressure cavity side to the pump means but preventing fluid passage from the pump means to the low pressure cavity side; and means for providing fluid passage from the pump means to the high pressure cavity side but preventing fluid passage from the high pressure cavity side to the pump means.

31. The clutch of claim 30 wherein the means for providing fluid passage from the low pressure cavity side to the pump means but preventing fluid passage from the pump means to the low pressure cavity side includes a suction side poppet valve and wherein the means for providing fluid passage from the pump means to the high pressure cavity side but preventing fluid passage from the high pressure cavity side to the pump means includes a suction side poppet valve.

32. The clutch of claim 28 wherein the means for causing the friction facing to engage and disengage with the drive disc further comprises, in combination: a cam mounted on the first member; and wherein the pump means comprises, in combination: a pump plunger reciprocal in a pump cavity and having an outer end for contact with the cam of the first member.

33. The clutch of claim 32 wherein the environment sensing means includes a stem which extends and retracts with the condition of the environment; and wherein the pump means comprises, in combination: a push plate for engagement with the stem of the environment sensing means; means for biasing the push plate against the stem of the environment sensing means; and means for biasing the push plate and the pump plunger apart.

34. The clutch of claim 28 wherein the shunting means comprises, in combination: a second environment sensing means carried by the second member; and bypass check valve means actuated by the second environment sensing means for allowing fluid to be bypassed from the high pressure cavity side to the low pressure cavity side of the cylinder.

35. The clutch of claim 34 wherein the environment sensing means includes a stem which extends and retracts with the condition of the environment; and wherein the shunting means further comprises, in combination: a push plate for engagement with the stem of the environment sensing means; means for biasing the push plate against the stem of the environment sensing means; and means for biasing the push plate and the bypass check valve means apart.

36. The clutch of claim 15 or 1 further comprising, in combination: fan blades operatively connected to the second member for rotation therewith.

* * * * *